United States Patent [19]

Marsan

[11] 4,290,464
[45] Sep. 22, 1981

[54] HOLDER FOR PORTABLE ELECTRIC CUTTING INSTRUMENT

[76] Inventor: Mario Marsan, 560 Beechtree Dr., Cincinnati, Ohio 45224

[21] Appl. No.: 132,322

[22] Filed: Mar. 20, 1980

[51] Int. Cl.$^3$ ............................................. B27C 5/10
[52] U.S. Cl. ........................... 144/136 C; 30/376; 83/745; 144/134 D; 310/50; 409/182
[58] Field of Search ................. 30/373, 375, 376, 377; 83/745; 409/110, 182; 310/50; 144/1 E, 1 F, 106, 134 R, 134 D, 136 C

[56] References Cited

U.S. PATENT DOCUMENTS

| | | | |
|---|---|---|---|
| 1,806,528 | 5/1931 | Fegley et al. | 30/377 |
| 2,610,658 | 9/1952 | Koeling | 30/373 |
| 2,671,476 | 3/1954 | Richards et al. | 30/376 |
| 2,688,347 | 9/1954 | Schmidt | 30/373 |
| 2,943,655 | 7/1960 | Pedersen et al. | 144/134 D |
| 2,952,281 | 9/1960 | Weber | 144/134 D |
| 3,087,520 | 4/1963 | Fielder | 144/136 C |
| 3,212,541 | 10/1965 | Burrows et al. | 144/134 D |
| 3,288,183 | 11/1966 | Eisbrenner | 144/104 |
| 3,943,985 | 3/1976 | Wowczyk | 83/574 X |

Primary Examiner—W. D. Bray
Attorney, Agent, or Firm—Frost & Jacobs

[57] ABSTRACT

A holder for a portable electrical cutting instrument having a cutting tool, the holder comprising a base plate having a planar bottom surface, an aperture in the base plate through which a cutting tool projects, means for clamping the cutting instrument above the aperture, first and second angular adjustment means secured to the top surface of the base plate on each side of the clamping means, a rigid harness interconnecting the first and second angular adjustment means with the clamping means for unitary movement therewith in angular planes of adjustment, whereby to provide tilting of the cutting instrument at least 45° in two directions from a plane vertical to the base plate, an elongated straight edge guide having a bottom surface coplanar with the planar bottom portion of the base plate, means for moving the edge guide to a desired position of adjustment relative to the cutting tool and parallel to the angular planes of adjustment. The holder provides the capability of cutting square, chamfered and/or mitered edges at any desired angle and cutting a work piece of any desired width, including relatively small finishing cuts.

10 Claims, 5 Drawing Figures

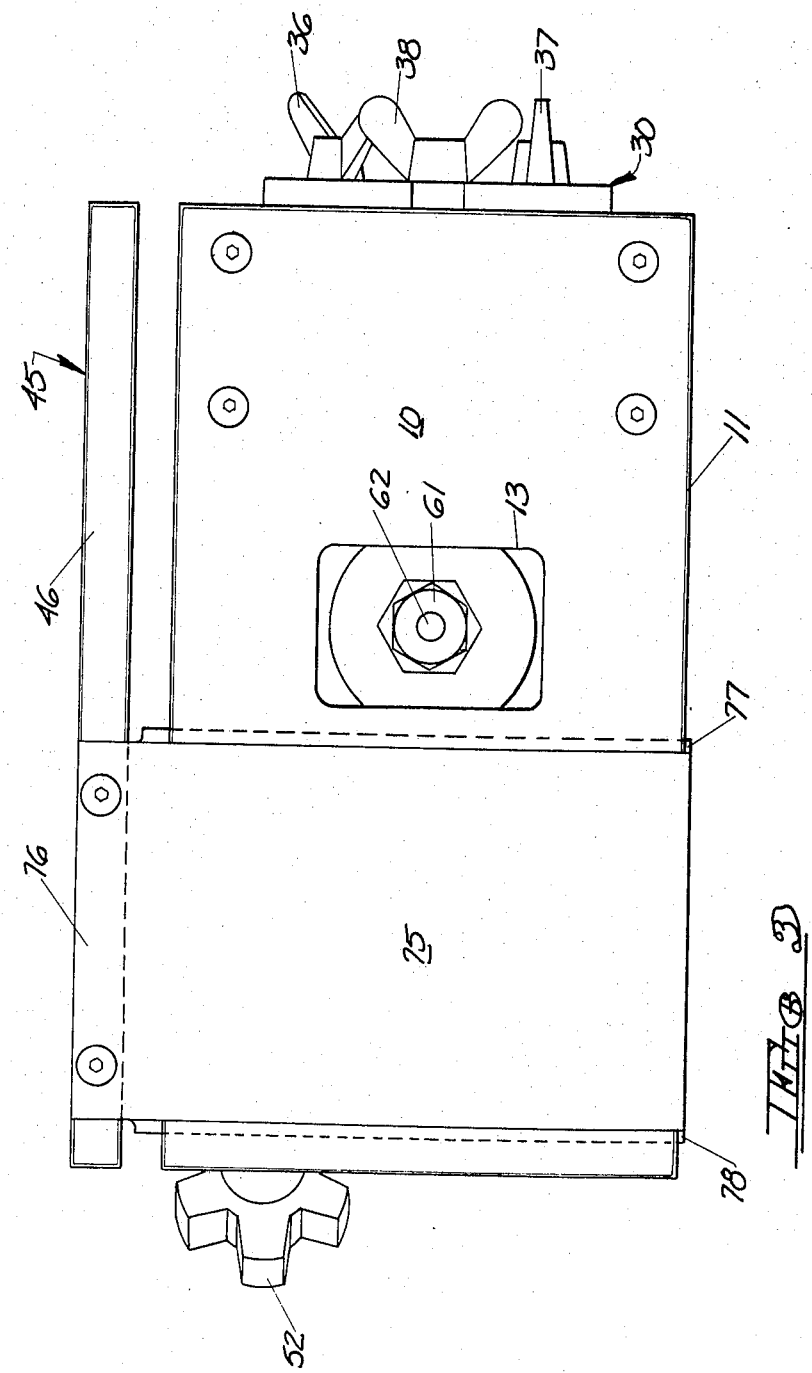

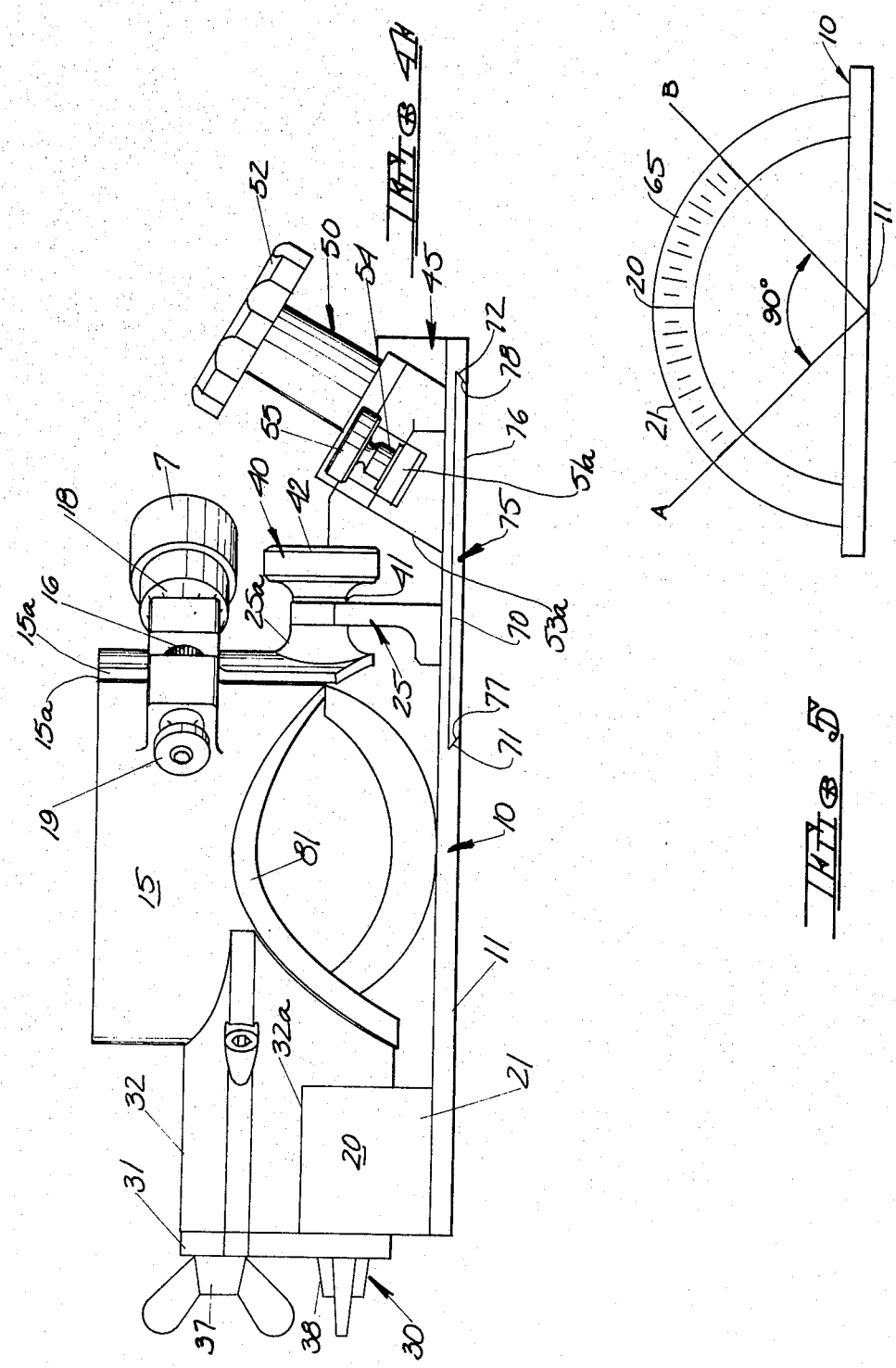

HOLDER FOR PORTABLE ELECTRIC CUTTING INSTRUMENT

SUMMARY OF THE INVENTION

This invention relates to a holder for a portable electric cutting instrument, more particularly a router, which provides the capability of cutting square, chamfered and/or mitered edges at any desired angle and making cuts in a workpiece of any desired width, including relatively small finishing cuts.

As is well known, a router is a high speed hand tool which is used extensively for cutting wood, plastic, laminates, and the like. Typically, a router is mounted on a platform or holder which provides adjustment in the vertical direction to vary the depth of cut by a cutting tool held in a chuck on the router. Frequently a straight edge is clamped on the surface of a workpiece along which the platform of the router is slid in order to make a cut parallel to the straight edge. If incremental cuts are needed, it is necessary to reset and reclamp the straight edge for each cut, in conventional practice.

U.S. Pat. No. 3,288,183, issued Nov. 29, 1966 to A. C. Eisbrenner, discloses an attachment for a portable electric hand drill enabling it to be used as a router in a generally vertical position. When used as a drill, holes may be produced at an angle to the surface of the workpiece by means of a securing link to adjustably locate the angular position of a base member relative to the drill. The securing link is pivotally connected at one end to the base member and is provided with a slot through which a lock screw extends for engagement with a member to which the drill is attached. An attachment guide is provided for moving the cutting tool parallel to a guide surface, this guide also comprising a slotted arm and lock screw for lateral adjustment.

U.S. Pat. No. 2,920,663, issued Jan. 12, 1960 to R. M. March, discloses an electric bevel edge cutter for forming hollow cut miter edges provided with a yoke to which the cutter is attached, the yoke being pivotally secured to a bar which is parallel to the major surface of the workpiece, the pivot joint being formed by a bolt passing through the yoke and bar, and a nut which may be tightened at a desired angle of adjustment between the yoke and bar.

Holders for routers or like cutting instruments which enable angled cuts but do not provide any type of angular adjustment are disclosed in U.S. Pat. Nos. 3,478,788; 3,767,948; 4,044,805; 4,069,849 and 4,102,370. Mitering guides which provide variation in the depth of cut, but not in angular adjustment, are disclosed in U.S. Pat. Nos. 3,212,541; 3,628,579 and 3,955,607.

U.S. Pat. No. 4,155,383, issued May 22, 1979 to E. V. Welliver, discloses an accessory for a router which provides angular adjustment for cutting in the horizontal plane only, and for depth of cut.

To the best of applicant's knowledge, the prior art has not disclosed nor suggested a holder for a portable electric router which is capable of cutting square, chamfered and/or mitered edges at any desired angle with precision and which permits successively feeding the instrument across the workpiece to make cuts of any desired size without resetting the straight edge for each cut. The above-mentioned Eisbrenner and March patents, while providing relatively simple arrangements for angular adjustment of cuts, do not permit precise adjustment to a desired angle of cut and do not provide sufficient rigidity in the adjustment means to ensure uniform, precise and reproducible results. Moreover, neither of these patents suggests the provision of a holder for a router capable of cutting square, chamfered and/or mitered edges at any desired angle with precision, in combination with means for making cuts in a workpiece of any desired size or width, including small finishing cuts.

It is a principal object of the present invention to provide a holder for a portable electric router which permits precise and uniform cutting of mitered edges at any desired angle and making cuts in a workpiece of any desired width.

It is a further object of the invention to provide a holder having the above capabilities when processing a workpiece which is too large to be handled in conventional bench size cutting instruments.

According to the invention there is provided a holder for a portable electric router comprising a base plate having a planar bottom surface, an orifice in the base plate adapted for passage of a cutting tool on the router therethrough, means positioned above the base plate for clamping the router in operative position, first and second angular adjustment means secured to a top surface of the base plate on each side of the clamping means, said clamping means being secured between the adjustment means and movable therewith in angular planes of adjustment, at least one of said adjustment means having an arcuate bearing surface of sufficient length to provide tilting of said router and its cutting tool at least 45° in two directions from a plane vertical to the base plate, means on each said adjustment means for rigidly securing the router and cutting tool at a desired angle of adjustment from said vertical plane in two directions, an elongated straight edge guide parallel to said angular planes of adjustment and having a bottom surface coplanar with the planar bottom surface of the base plate, and means for moving said edge guide laterally relative to said angular planes of adjustment to a desired position of displacement parallel thereto.

BRIEF DESCRIPTION OF THE DRAWING

Reference is made to the accompanying drawing wherein:

FIG. 3 is a bottom view of the holder of FIG. 1;

FIG. 4 is a side view of the holder of FIG. 1; and

FIG. 5 is a diagrammatic view showing angular adjustment of the holder of the invention.

DETAILED DESCRIPTION

Figure 1:
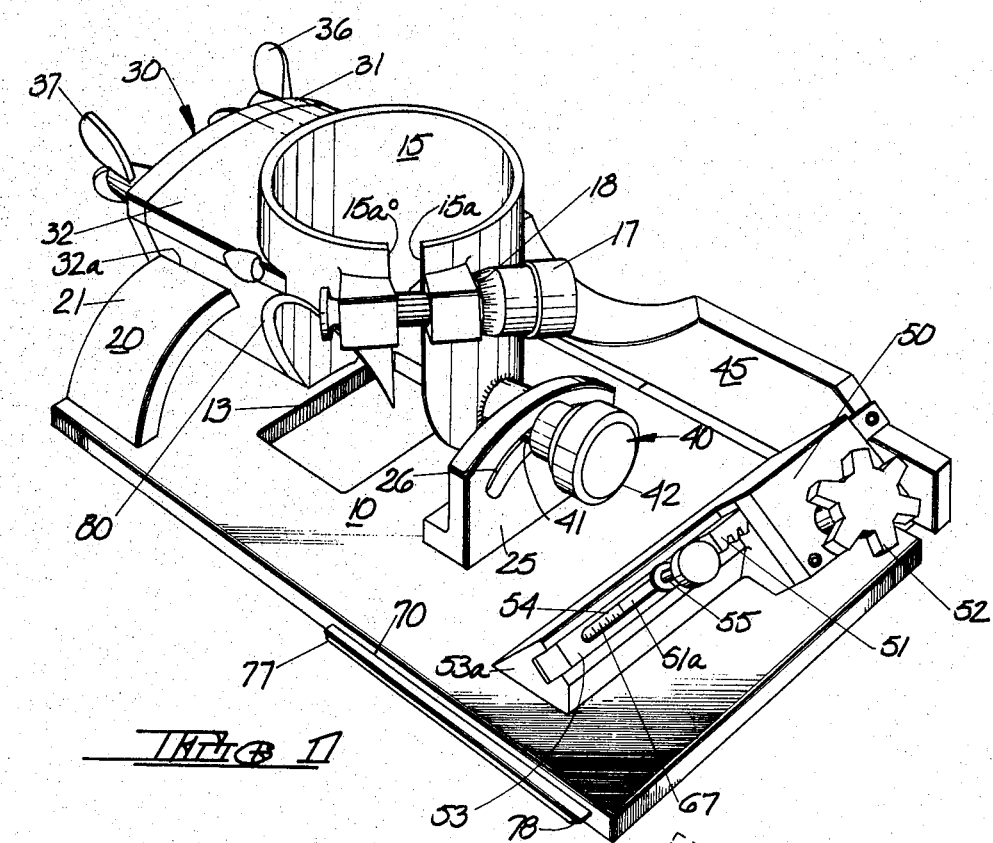
FIG. 1 is a perspective view illustrating a preferred embodiment of a holder in accordance with the invention.

Referring to FIGS. 1-4 of the drawings, an exemplary holder is shown having a base plate indicated generally at 10, preferably of rectangular configuration. The base plate 10 has a planar bottom surface 11 and preferably at least one straight longitudinal side edge 12. Base plate 10 is further provided with an aperture or orifice indicated at 13, preferably substantially centrally thereof, through which a cutting tool of a portable electric router is adapted to project, as hereinafter described. Means indicated generally at 15 are provided positioned above the base plate for clamping a router in operative position above the aperture 13. The means 15 preferably comprises a vertically oriented cylindrical member or sleeve of a size to accommodate a cylindrical housing of a portable electric router. The cylindrical section has a vertically oriented opening or slot defined by edges 15a, as shown in FIGS. 1 and 4. A pinion gear indicated at 16 is preferably mounted in overlying relation to the slot formed between edges 15a. Pinion gear 16 engages a rack (not shown) which is ordinarily provided on the housing of a router in parallel relation to the cutting tool thereof. An adjusting knob is provided as indicated at 17 to turn the pinion gear and thereby move the router upwardly or downwardly within the cylindrical section 15 in order to adjust the depth of cut. A gauge may be provided as indicated at 18, in order to measure the depth of cut, or projection of the end of the cutting tool below the planar bottom surface 11 of base plate 10. A locking nut 19 is further provided on the threaded end of a shaft for the pinion gear 16 opposite from the adjusting nut 17, in order to draw the edges 15a closer together in clamping engagement with the housing of the router.

It will be understood that the above described means for adjusting the depth of cut is known in the art and is not considered a part of the present invention.

Angular adjustment means are provided, secured to the top surface of base plate 10, comprising a first adjustment means indicated generally at 20 and a second adjustment means indicated generally at 25, on opposite sides of the clamping means 15 and rigidly secured thereto. The arrangement is such that the clamping means and router secured therein may be moved in angular planes of adjustment parallel to the straight side edge 12 of the base plate 10. First adjustment means 20 may be of rectangular cross-sectional configuration as shown in the drawing, and is provided with an arcuate bearing surface indicated at 21. The cross-sectional configuration of means 20 may be trapezoidal, triangular, or semi-circular.

Second angular adjustment means 25 comprises an upstanding flange-like member secured to base plate 10 having an arcuate slot 26 therein which may act as a bearing surface. Bearing 21 and slot 26 are coaxial.

The first adjustment means 20 is provided with means indicated generally at 30 for securing the clamping means 15 and hence the router and its cutting tool at any desired angle of adjustment, preferably up to at least 45° in either direction from a plane vertical to base plate 10. Means 30 comprises a metallic plate 31 of generally triangular configuration which abuts against a harness 32 which may be formed of metal or polymerized resin which conforms to the outer surface of the cylindrical section 15 and is rigidly secured thereto. Metallic plate 31 is provided with a plurality of openings, three being shown by way of example in the drawings, through which locking screws indicated at 33, 34 and 35 project. The locking screws 33–35 are non-rotatably secured in the harness 32, and locking wing nuts 36, 37 and 38 are provided on each of the locking screws 33, 34 and 35 respectively. The harness 32, which is also of a generally triangular configuration conforming to that of metallic plate 31, is provided with a cut-out portion indicated at 32a for a close sliding fit on the arcuate bearing 21. The outer edge of bearing 21 projects very slightly beyond the outer edge of harness 32 and abuts against metallic plate 31, as shown in FIG. 4. The arrangement is such that tightening of the nuts 36–38 upon their respective screws 33–35 causes the metallic plate 31 to press against the outer edge of bearing 21 and hold the first angular adjustment means at a selected angle by frictional engagement.

Second adjustment means 25 is also rigidly secured to the outer surface of cylindrical section 15 by a boss or the like as shown at 25a in FIG. 4. Means indicated generally at 40 is provided for securing the router at a desired angle of adjustment. Means 40 comprises a threaded screw indicated at 41 non-rotatably secured in boss 25a and projecting through the arcuate slot 26, and a lock nut 42 which may be tightened to provide a frictional locking engagement with the outwardly facing surface of the member 25. Other mechanical equivalents could be substituted. Clearance may be provided between screw 41 and slot 26, since it is not necessary that slot 26 act as a bearing surface. In such case, the slot 26 need not have the same radius of curvature as bearing surface 21. Alternatively, the lower edge of slot 26 may act as a bearing surface for screw 41.

The above described arrangement thus provides a rigid mounting of the clamping means 15 between first and second angular adjustment means 20 and 25 on opposite sides thereof, thereby positively and rigidly securing the clamping means and hence the router and its cutting tool on both sides of the clamping means at any desired angle of adjustment.

An elongated straight edge guide indicated at 45 is provided which is parallel to the angular planes of adjustment of the adjustment means 20 and 25, the straight edge guide 45 having a bottom surface 46 coplanar with the planar bottom surface 11 of base plate 10. The edge guide 45 is adjustable laterally relative to the side edge 12 and the cutting tool of the router by means indicated generally at 50. Adjustment means 50 may comprise a rack 51 secured at one end to edge guide 45 and passing through a housing containing a pinion gear (not shown) having an outwardly extending shaft on which is secured an adjustment knob 52. It is evident that rotation of the adjustment knob 52 and the pinion gear connected thereto causes the rack and hence the edge guide 45 to move laterally with respect to the side edge 12 of base plate 10.

Preferably means is provided for locking edge guide 45 in a desired position of displacement relative to side edge 12. As shown in the drawings such locking means may comprise an extension 51a of reduced cross sectional area projecting partially across base plate 10 in a direction opposite from edge guide 45, and an overlying plate 53 having an elongated slot 54 therein, the plate 53 being secured rigidly in any suitable manner, e.g. by a supporting base 53a, to the upper surface of base plate 10. A locking screw indicated at 55 is provided which extends through the slot 54 into a threaded opening (not shown) in supporting base 53a, the arrangement being such that tightening of locking screw 55 causes frictional engagement of plate 53 with extension 51a, thereby preventing movement of rack 51 and edge guide 45 secured thereto.

Figure 2:
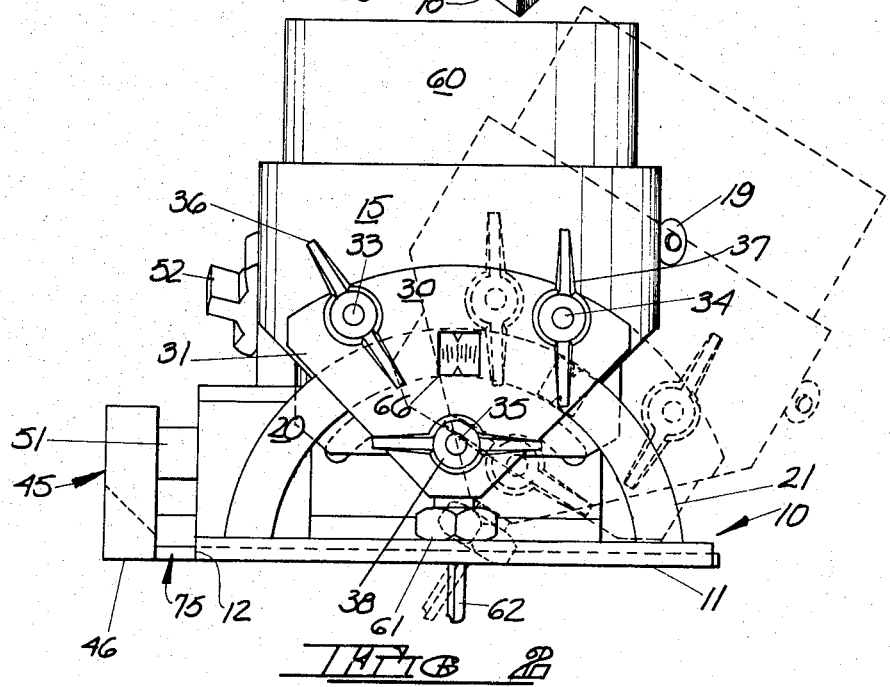
FIG. 2 is an end view of the holder of FIG. 1.

In FIG. 2 a portable electric router is indicated generally at 60 in schematic manner operatively positioned in clamping means 15. The router is provided with a conventional chuck indicated at 61 in which is secured a cutting tool 62 projecting downwardly beyond the lower surface 11 of base plate 10. FIG. 2 further shows in broken lines angular adjustment away from the vertical of clamping means 15, the router and its cutting tool 62 in a plane parallel to side edge 12 and edge guide 45.

Referring next to FIG. 5, the preferred arrangement for angular adjustment is shown wherein the arcuate bearing 20 is so arranged and dimensioned that the upper bearing surface 21 lies along radii of a circle having a center at the bottom surface 11 of base plate 10 and the axis of a cutting tool 62. Thus angular planes of adjustment of the router (such as A and B in FIG. 5) intersect the planar bottom surface of base plate 10 along a line passing through the axis of the cutting tool and parallel to the straight edge guide. This provides precise cutting capability since the planes of angular rotation pass through the axis of the cutting tool rather than being offset therefrom.

In a preferred embodiment, a scale graduated in degrees is provided on the outwardly facing surface of arcuate bearing 20, as indicated at 65 in FIG. 5. An opening is provided in the triangular plate 30 having a pointer or cross-hair, as indicated at 66 in FIG. 2, through which the scale 65 may be viewed. Accordingly, it is possible to read precisely the degree of angular adjustment and to clamp the router 60 at the desired angle by successively tightening lock nuts 36, 37 and 38 and lock nut 42, as previously described.

It is also preferred to provide a scale graduated in inches and/or centimeters as indicated at 67 in FIG. 1 for measuring the amount of lateral displacement or adjustment of the straight edge guide 45. This scale may provide a measurement of the distance from the outer edge of edge guide 45 to the axis of the cutting tool 62. It is contemplated that lateral adjustment up to about 1½ inch of edge guide 45 is sufficient for most cutting operations.

In order to ensure that edge guide 45 will remain rigid in all positions of adjustment and parallel to the angular planes of adjustment, it is preferred to provide a recess indicated at 70 in base plate 10 defined by parallel undercut grooves 71, 72 (FIG. 4), the recess 70 accommodating a flat slide plate 75 secured to edge guide 45, the slide plate 75 having a planar bottom surface 76 coplanar with the bottom surface 11 of base plate 10. Slide plate 75 is provided with parallel chamfered edges 77, 78 which mate with undercut grooves 71 and 72, and the slide plate 75 is dimensioned to have a nice sliding fit in the recess 70. Slide plate 75 preferably occupies a substantial portion of the bottom surface of base plate 10 as will be apparent from FIGS. 1 and 3, so that the spaced apart edges 77 and 78, bearing against grooves 71 and 72, will prevent positioning of edge guide 45 out of parallel to the angular planes of adjustment.

While preferred means 30–38 and 40–42 for securing the router at a desired angle of adjustment have been described above, it is considered to be within the scope of the invention to substitute equivalent means for rigidity securing the router in a desired position of adjustment. Similarly, while rack and pinion means 50–52 have been described above for lateral movement of edge guide 45, it is within the scope of the invention to provide equivalent means such as a worm gear, micrometer screw gear, or a simple slide bar which can be frictionally locked in a desired position of adjustment.

In order to reduce weight and provide access and visibility to the lower portion of the router, including the chuck 61 and cutting tool 62, the lower portion of the cylindrical clamping member 15 may be cut away as indicated at 80 and 81 in FIGS. 1 and 4, without sacrifice of rigidity and stability which result from the secure mounting of member 15 between the members 25a and 32 which constitute an interconnecting harness on opposite sides of member 15.

In using the holder of the present invention with a portable electric router the desired adjustment of the cutting angle is normally selected before starting the router. After securing the router in the desired angle of vertical adjustment by tightening lock nuts, 36, 37, 38 and 42 the edge guide 45 is adjusted for the size or width of cut desired. It will be understood that the conventional straight edge clamped to the workpiece is used in connection with the present invention, and after starting the router it is passed along the edge of the workpiece with the outer edge of edge guide 45 sliding along the straight edge clamped to the workpiece. However, since the edge guide 45 is adjustable laterally, it becomes unnecessary to reset the straight edge which is clamped to the work piece for each incremental or successive cut. Moreover, since the holder is portable, it is readily adapted for use one workpieces of large size which cannot be handled in usual bench size cutting equipment.

It is therefore evident that the present invention prívides the capability of cutting square, chamfered and/or mitered edges at any desired angle with precision and of making cuts in a workpiece of any desired size or width, including small finishing cuts.

I claim:

1. A holder for a portable electric router comprising a base plate having planar bottom surface, an orifice in said base plate adapted for passage of a cutting tool on said router therethrough, means positioned above said base plate for clamping said router in operative position, first and second angular adjustment means secured to a top surface of said base plate on each side of said clamping means, said clamping means being secured between said adjustment means and movable therewith in angular planes of adjustment, at least one of said adjustment means having an arcuate bearing surface of sufficient length to provide tilting of said clamping means, said router and its cutting tool at least 45° in two directions from a plane vertical to said base plate, means on each said adjustment means for rigidly securing said router and cutting tool at a desired angle of adjustment from said vertical plane in two directions, an elongted straight edge guide parallel to said angular planes of adjustmet and having a bottom surface coplanar with said planar bottom surface of said base plate, and means for moving said edge guide laterally relative to said angular planes of adjustment to a desired position of displacement parallel thereto.

2. The holder claimed in claim 1, including means for securing said edge guide in said desired position of displacement.

3. The holder claimed in claim 1, wherein said angular planes of adjustment intersect said planar bottom along a line passing through the axis of said cutting tool and parallel to said straight edge guide.

4. The holder claimed in claim 1, wherein said securing means on each said first and second angular adjustment means comprises at least one locking screw and locking nut frictionally engageable with each angular adjustment means.

5. The holder claimed in claim 1, including a scale on said first angular adjustment means graduated in degrees.

6. The holder claimed in claim 1, wherein said means for moving said edge guide comprise a rack and pinion gear.

7. The holder claimed in claim 6, including a locking out for frictional engagement with said rack and pinion gear, whereby to secure said edge guide in said desired position of displacement.

8. The holder claimed in claim 1, including a rigid harness interconnecting said first and second angular adjustment means with said means for clamping said router.

9. The holder claimed in claim 1, including a recess in said base plate defined by parallel undercut grooves perpendicular to said straight side edge, and including a slide plate secured to said edge guide and perpendicular thereto, said slide plate being dimensioned to have a nice sliding fit in said recess, said slide plate having a planar bottom surface coplanar with said bottom surface of said base plate.

10. A holder for a portable electric cutting instrument having a cutting tool projecting therefrom, said holder comprising a base plate having a planar bottom surface over the major portion thereof, an aperture in said base plate through which said cutting tool projects when said cutting instrument is secured in said holder, means for clamping said cutting instrument above said aperture, first and second angular adjustment means secured to a top surface of said base plate with one on each side of said clamping means, a rigid harness interconnecting said first and second angular adjustment means with said clamping means for unitary movement therewith in angular planes of adjustment, at least one of said adjustment means having an arcuate bearing surface of sufficient length to provide tilting of said cutting instrument at least 45° in two directions from a plane vertical to said base plate, means on each said adjustment means for rigidly securing said cutting instrument at a desired angle of adjustment, an elongated, straight edge guide having a bottom surface coplanar with said planar bottom portion of said base plate, said straight edge guide being parallel to said angular planes of adjustment, means for moving said edge guide to a desired position of adjustment relative to said cutting tool, and means for securing said edge guide in said desired position of adjustment parallel to said angular planes of adjustment.

* * * * *